United States Patent
Yasutani et al.

(10) Patent No.: US 7,432,845 B2
(45) Date of Patent: Oct. 7, 2008

(54) HOT-WATER SUPPLY SYSTEM

(75) Inventors: Kumiko Yasutani, Nagoya (JP); Shinji Nagata, Nagoya (JP)

(73) Assignee: Rinnai Corporation, Nagoya-shi (JP)

( * ) Notice: Subject to any disclaimer, the term of this patent is extended or adjusted under 35 U.S.C. 154(b) by 232 days.

(21) Appl. No.: 11/379,139

(22) Filed: Apr. 18, 2006

(65) Prior Publication Data

US 2006/0237550 A1 Oct. 26, 2006

(30) Foreign Application Priority Data

Apr. 26, 2005 (JP) ............................. 2005-128378

(51) Int. Cl.
*G08C 19/12* (2006.01)
(52) U.S. Cl. .................... 341/173; 341/176; 137/51; 137/551

(58) Field of Classification Search ............ 340/870.07; 137/51, 551; 341/173, 176
See application file for complete search history.

(56) References Cited

U.S. PATENT DOCUMENTS 6,286,764 B1 * 9/2001 Garvey et al. ............ 236/12.12

FOREIGN PATENT DOCUMENTS

JP 62-179561 11/1987

* cited by examiner

*Primary Examiner*—Timothy Edwards, Jr.
(74) *Attorney, Agent, or Firm*—Rankin, Hill & Clark LLP

(57) ABSTRACT

To provide an inexpensive hot-water supply system that allows a user to readily select a desired unit for a physical quantity indicated on a display section of a remote controller. A bathroom-installed remote controller 4 is provided with a indication unit switching device that switches the units of hot-water temperature and hot-water amount represented by data transmitted from a water heater and indicated on a display section 20 between Fahrenheit/gallon (shown in FIG. 3(a)) and Celsius/liter (shown in FIG. 3(b)) depending on the presence or absence of long press of an operational switch 32 while the water heater is in a stand-by state.

4 Claims, 9 Drawing Sheets

| POINTER | INDICATION IN DEGREES FAHRENHEIT [°F] | IN CELSIUS [°C] | CONTROLLED TEMPERATURE IN DEGREES CELSIUS [°C] |
|---|---|---|---|
| 1 | 98 | 37 | 36.7 |
| 2 | 100 | 38 | 37.8 |
| 3 | 102 | 39 | 38.9 |
| 4 | 104 | 40 | 40.0 |
| 5 | 106 | 41 | 41.1 |
| 6 | 108 | 42 | 42.2 |
| 7 | 110 | 43 | 43.3 |
| 8 | 115 | 46 | 46.1 |
| 9 | 120 | 49 | 48.9 |
| 10 | 125 | 52 | 51.7 |
| 11 | 130 | 54 | 54.4 |
| 12 | 135 | 57 | 57.2 |
| 13 | 140 | 60 | 60.0 |
| 14 | 150 | 66 | 65.6 |
| 15 | 160 | 71 | 71.1 |
| 16 | 185 | 85 | 85.0 |

FIG. 9

| INDICATION IN DEGREES FAHRENHEIT [°F] | IN CELSIUS [°C] |
|---|---|
| 98 | 37 |
| 100 | 38 |
| 102 | 39 |
| 104 | 40 |
| 106 | 41 |
| 108 | 42 |
| 110 | 43 |
| 115 | 46 |
| 120 | 49 |
| 125 | 52 |
| 130 | 54 |
| 135 | 57 |
| 140 | 60 |
| 150 | 66 |
| 160 | 71 |
| 185 | 85 |

110

HOT-WATER SUPPLY SYSTEM

BACKGROUND OF THE INVENTION

1. Field of the Invention

The present invention relates to a hot-water supply system comprising a water heater and a remote controller for remotely controlling the water heater. In particular, it relates to indication of a physical quantity concerning the operation of the water heater on the remote controller.

2. Description of the Related Art

There are known hot-water supply systems in which a water heater installed outdoors is remotely controlled by means of a remote controller installed indoors, such as in a bathroom or kitchen (for example, see Japanese Utility-Model Laid-Open No. 62-179561). Such a hot-water supply system is provided with a water amount sensor that detects the flow rate of water supplied to the water heater, and the flow rate detected by the water amount sensor is indicated on a display section on the remote controller so that the user can check the amount of water used.

In addition, the remote controller has a switch for setting hot-water temperature. Furthermore, if the hot-water supply system has a bath-filling function of supplying a predetermined amount of hot water to a bathtub, the system has a switch for setting hot-water amount. In such a hot-water supply system having the bath-filling function, hot-water temperature and hot-water amount are indicated on the display section of the remote controller as physical quantities representing the operational state of the water heater.

In a conventional hot-water supply system, the units of physical quantities (hot-water temperature, hot-water amount or the like) indicated on the remote controller are previously set and cannot be changed. However, the units familiar to a user of a hot-water supply system may vary with the country or area the user lives in. For example, in Japan, hot-water temperature is usually expressed in degrees Celsius, and hot-water amount is usually expressed in liter. However, in another country or area, hot-water temperature may be expressed in degrees Fahrenheit, and hot-water amount may be expressed in gallon.

Thus, in the case where a hot-water supply system is used in a plurality of countries or areas, in order to provide, on the display section of the remote controller, indications of physical quantities representing the operational state of the water heater in units familiar to the users in the respective countries or areas, a plurality of kinds of remote controllers have to be prepared that are different in specification of the units used for indicating the physical quantities. However, preparing such a plurality of remote controllers increases the number of Steps to be managed during manufacture and selling of the remote controllers, which can cause an increase in cost of the hot-water supply system.

In addition, if a user desires to change the unit of a physical quantity once a remote controller designed for the particular unit is installed, the user inconveniently has to purchase another remote controller designed for the desired unit as a replacement for the installed remote controller.

Thus, an object of the present invention is to provide an inexpensive hot-water supply system that allows a user to readily select a desired unit for a physical quantity indicated on a display section of a remote controller.

SUMMARY OF THE INVENTION

The present invention has been devised in order to attain the object described above and relates to improvement of a hot-water supply system that comprises a water heater and a remote controller for remotely controlling the water heater that has a display section for indicating a physical quantity concerning the operation of the water heater.

The hot-water supply system has: a unit selection switch for selecting the unit for indicating the physical quantity on the display section from among a plurality of kinds of units previously set through the operation of a user; and indication unit switching means for indicating the physical quantity on the display section in the unit selected by the unit selection switch.

According to the present invention, the user of the hot-water supply system can select a desired unit for a physical quantity by manipulating the unit selection switch on the remote controller. Therefore, there is no need of preparing remote controllers that are different in specification of the units for indicating physical quantities suitable for various countries or areas in which the hot-water supply system is used. Thus, the increase in cost can be avoided that would occur if a plurality of types of remote controllers that are different in specification of the units for indicating physical quantities are prepared. In addition, if a user desires to change the unit of a physical quantity indicated on the remote controller after the hot-water supply system is installed and put into service, the user can readily change the unit of the physical quantity by manipulating the unit selection switch. Thus, there is no need of replacing the existing remote controller with a new one that is different in specification of units for indicating physical quantities, and thus, the hot-water supply system is highly usable.

The water heater transmits in-predetermined-unit data corresponding to data about the physical quantity expressed in a predetermined unit to the remote controller, the indication unit switching means is provided on the remote controller, and when the indication unit switching means receives the in-predetermined-unit data transmitted from the water heater, the indication unit switching means indicates the physical quantity corresponding to the in-predetermined-unit data in the unit selected by the unit selection switch.

According to the present invention, the indication unit switching means on the remote controller changes the units of the physical quantities indicated on the display section of the remote controller. Thus, the user need not perform again a manipulation of selecting the units of the physical quantities indicated on the remote controller if the water heater is replaced. In addition, in the case where the hot-water supply system has a plurality of remote controllers, the user can select the units of physical quantities indicated on the display sections of the remote controllers individually by manipulating the unit selection switch on each remote controller.

Furthermore, the indication unit switching means comprises data-in-selected-unit transmission means provided on the water heater for transmitting in-selected-unit data that represents the physical quantity in the unit selected by the unit selection switch to the remote controller; and display control means provided on the remote controller for indicating the in-selected-unit data on the display section.

According to the present invention, the water heater transmits in-selected-unit data that is expressed in the unit selected by the unit selection switch to the remote controller, and the remote controller provides an indication of the in-selected-unit data on the display section. Thus, the user need not perform again a manipulation of selecting the units of the physical quantities indicated on the remote controller if the remote controller is replaced. In addition, in the case where the hot-water supply system has a plurality of remote controllers, the user can change the units of physical quantities indicated on the display sections of the remote controllers at once by selecting the units by manipulating the unit selection switch. Thus, there is no need of selecting the units of physical quantities separately for each remote controller, and thus, the hot-water supply system is highly usable.

Furthermore, the hot-water supply system has an out-of-bathroom remote controller provided outside a bathroom and an in-bathroom remote controller provided in the bathroom as the remote controller, the out-of-bathroom remote controller has first communications means for communicating with the in-bathroom remote controller, a first calling switch manipulated by a user, first alarm means, and first call processing means that transmits a first calling signal to the in-bathroom remote controller when the first calling switch is manipulated, and makes the first alarm means issue an alarm when a second calling signal transmitted from the in-bathroom remote controller is received, and the in-bathroom remote controller has second communications means for communicating with the out-of-bathroom remote controller, a second calling switch manipulated by a user, second alarm means, and second call processing means that transmits the second calling signal to the out-of-bathroom remote controller when the second calling switch is manipulated, and makes the second alarm means issue an alarm when the first calling signal transmitted from the out-of-bathroom remote controller is received.

According to the present invention, if a user taking a bath manipulates the second calling switch on the in-bathroom remote controller, the in-bathroom remote controller transmits the second calling signal to the out-of-bathroom remote controller, and the out-of-bathroom remote controller having received the second calling signal makes the first alarm means issue an alarm. Similarly, if a user outside the bathroom manipulates the first calling switch on the out-of-bathroom remote controller, the out-of-bathroom remote controller transmits the first calling signal to the in-bathroom remote controller, and the in-bathroom remote controller having received the first calling signal makes the second alarm means issue an alarm.

Thus, one of the user in the bathroom and the user outside the bathroom can call the other and respond to the call from the other by manipulating the first calling switch or the second calling switch.

BRIEF DESCRIPTION OF THE DRAWINGS

FIG. 9 illustrates a Celsius/Fahrenheit conversion table for hot-water temperature according to the second embodiment.

DETAILED DESCRIPTION OF THE PREFERRED EMBODIMENTS

Figure 1:
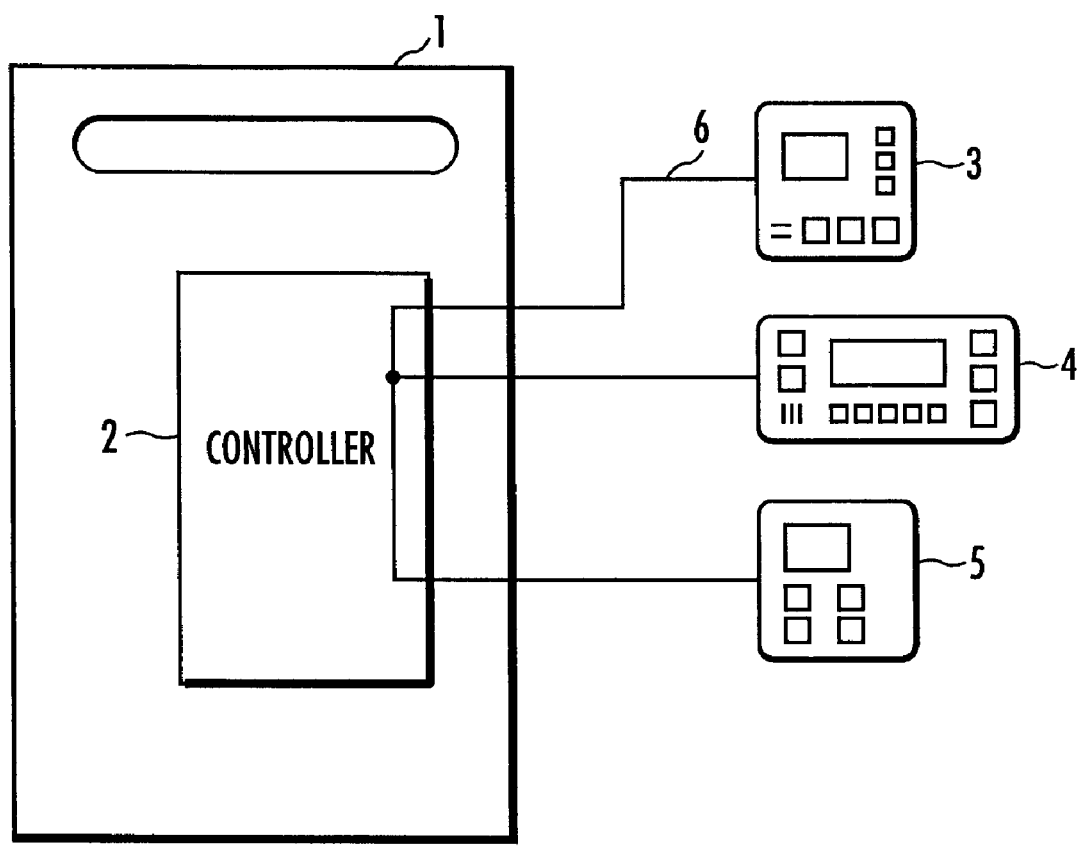
FIG. 1 is a diagram showing a whole structure of a hot-water supply system according to the present invention.
Figure 2:
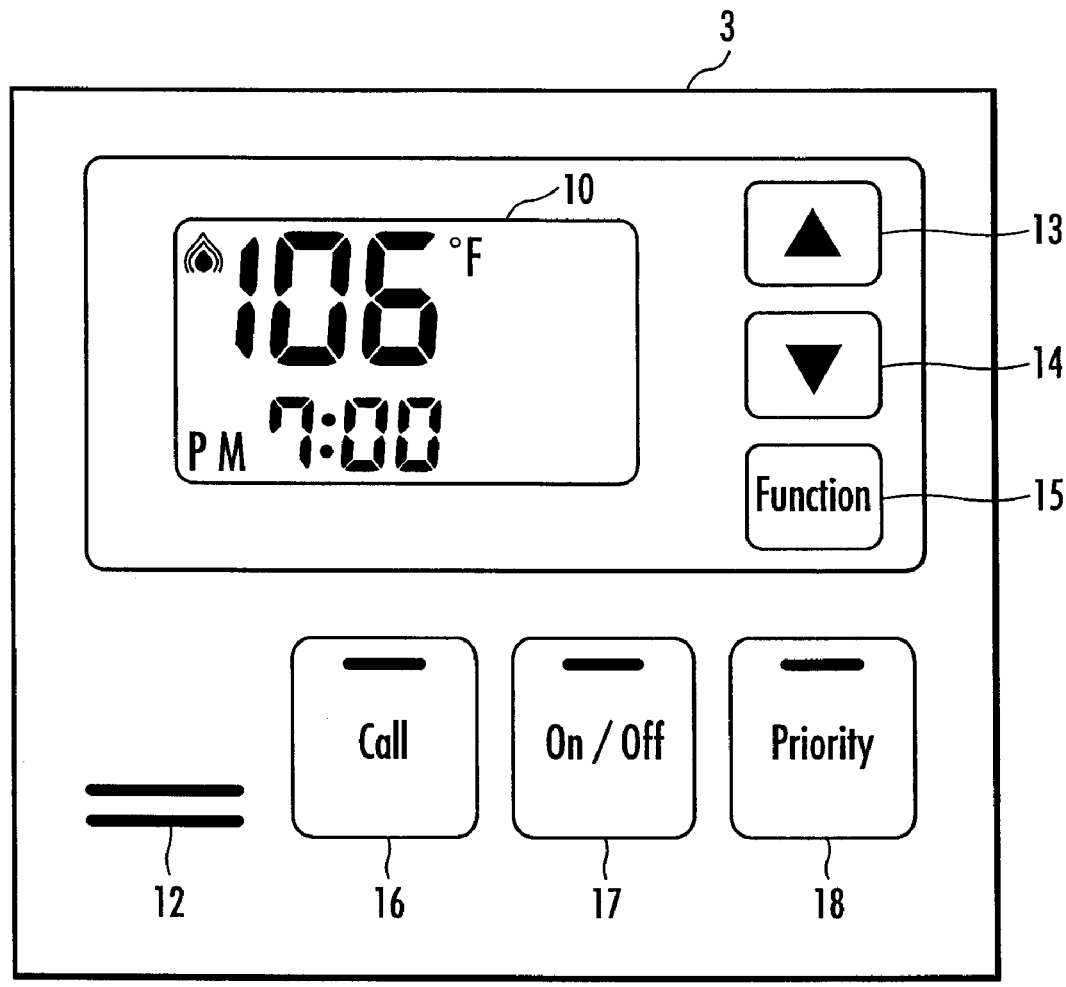
FIG. 2 shows an appearance of a kitchen-installed remote controller shown in FIG. 1.
Figure 2:
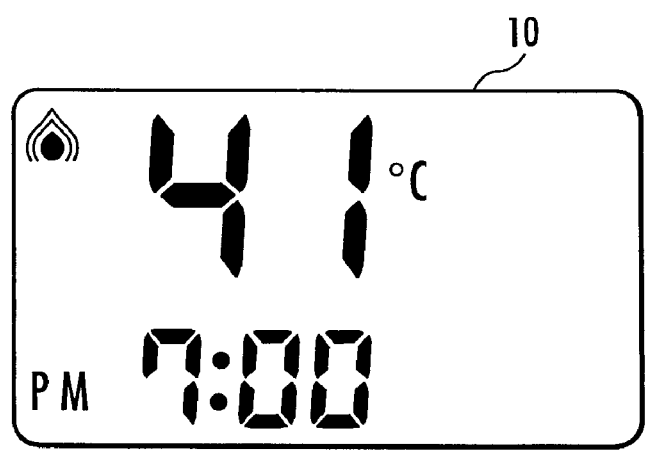
Figure 3:
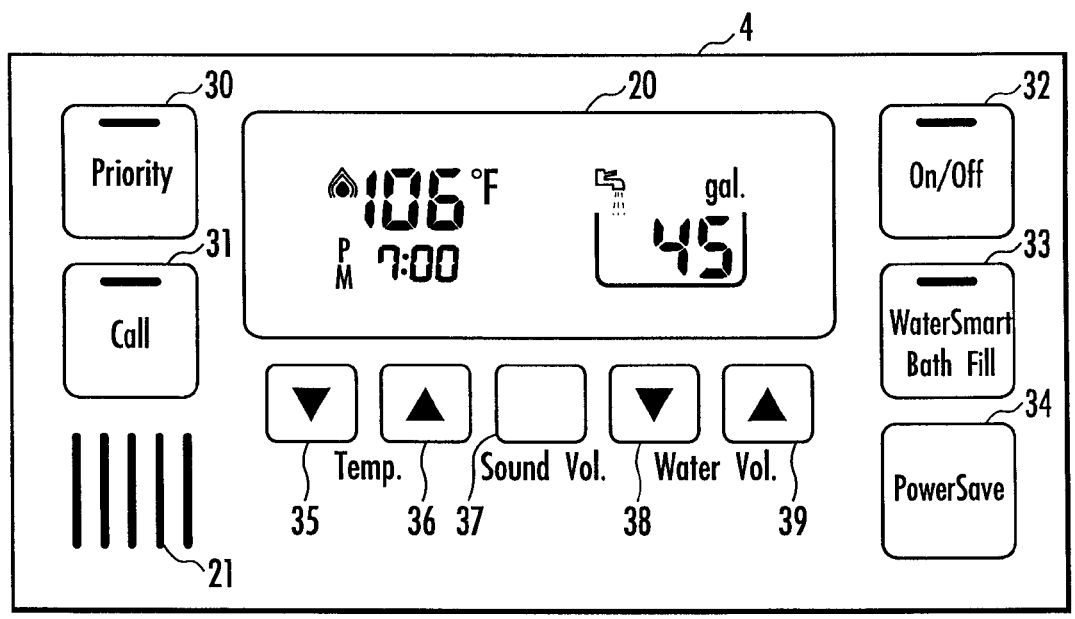
FIG. 3 shows an appearance of a bathroom-installed remote controller shown in FIG. 1.
Figure 3:
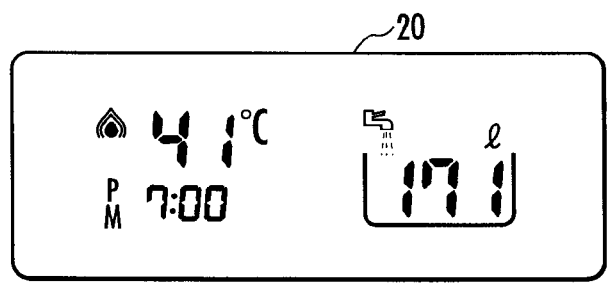
Figure 4:
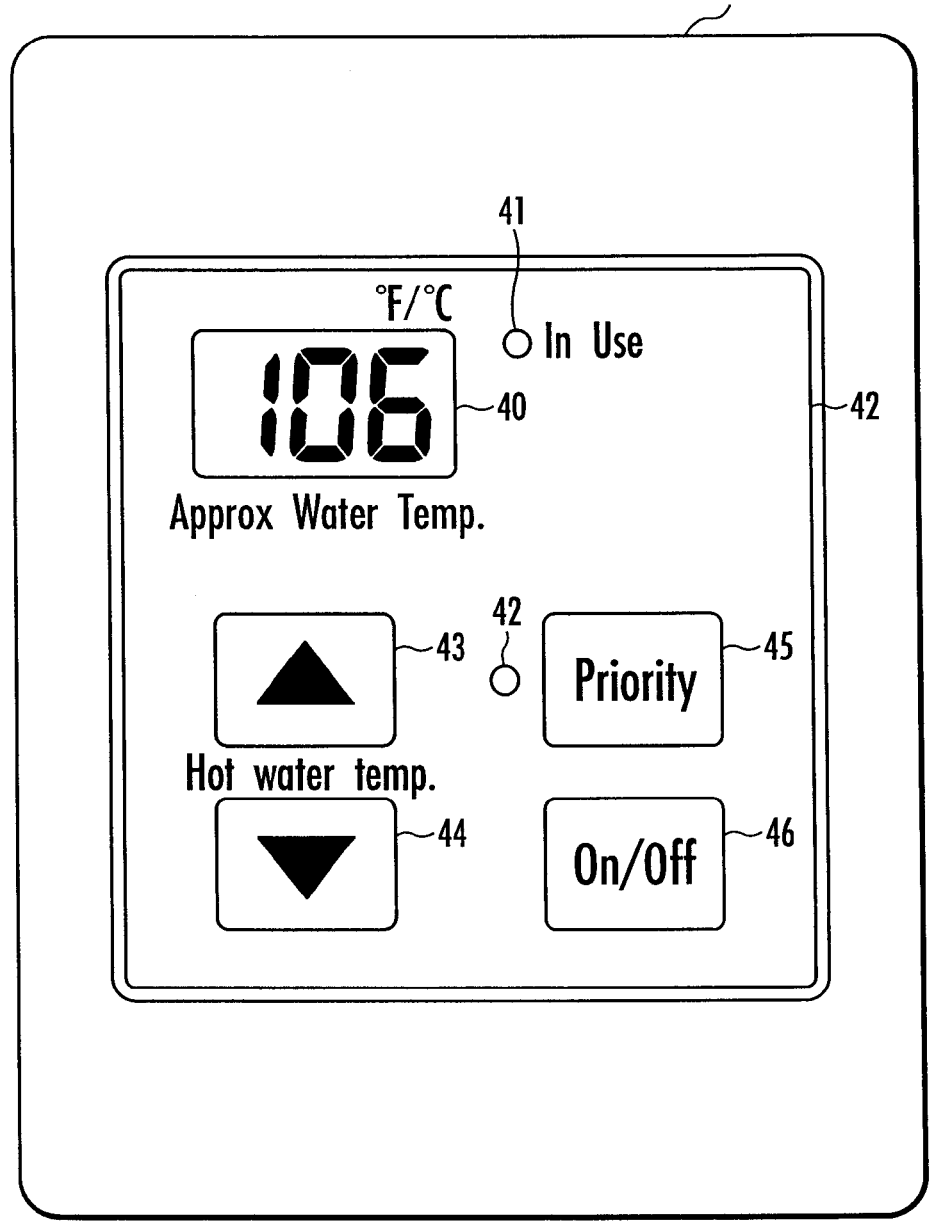
FIG. 4 shows an appearance of an extension remote controller shown in FIG. 1.
Figure 4:
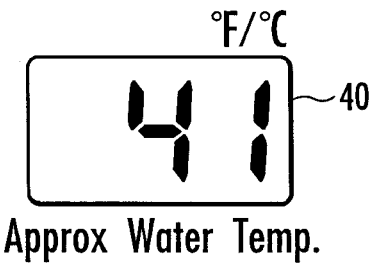
Figure 5:
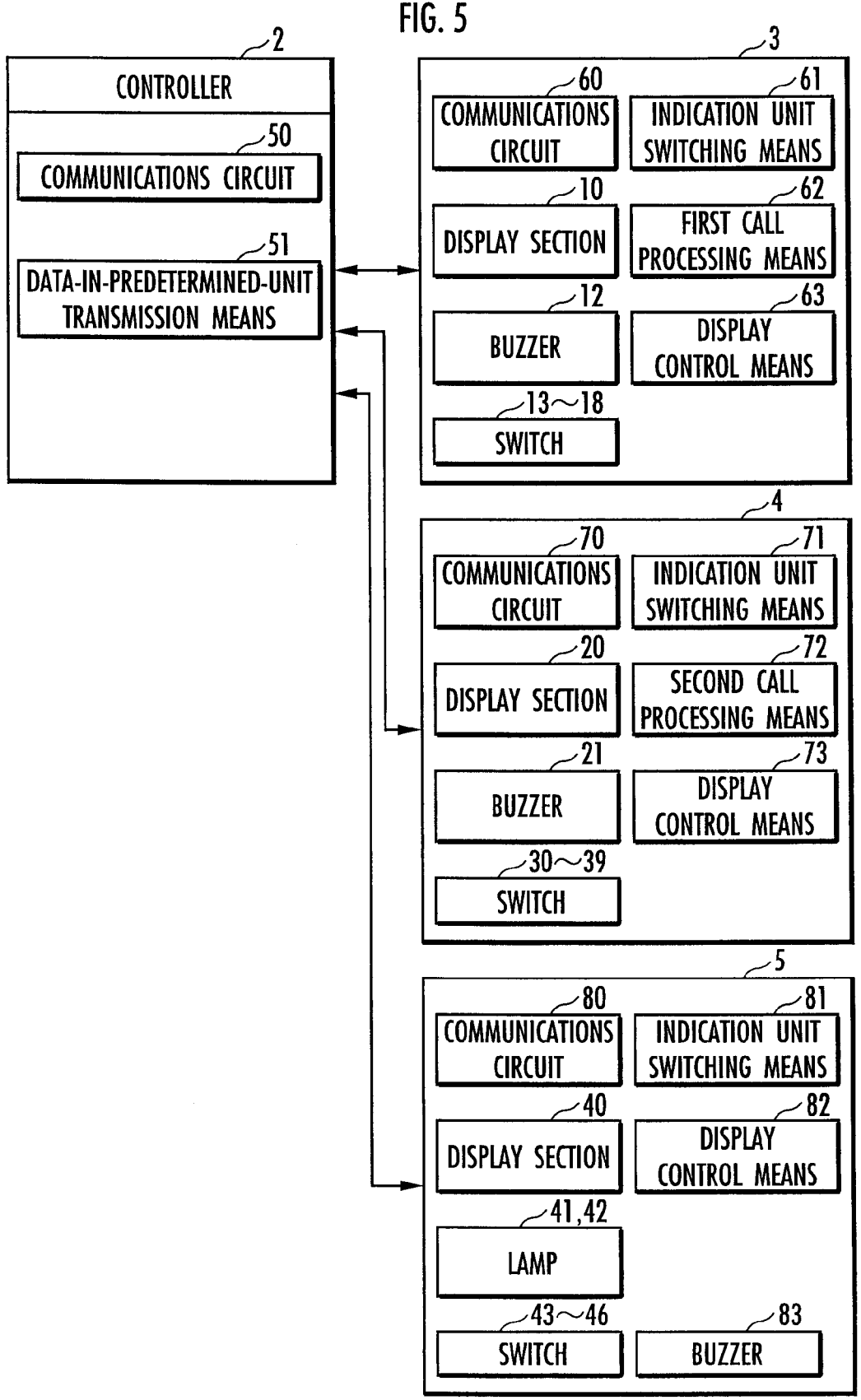
FIG. 5 is a control block diagram for illustrating a first embodiment of the present invention.
Figure 6:
FIG. 6 illustrates a Celsius/Fahrenheit conversion table for hot-water temperature according to the first embodiment.
Figure 7:
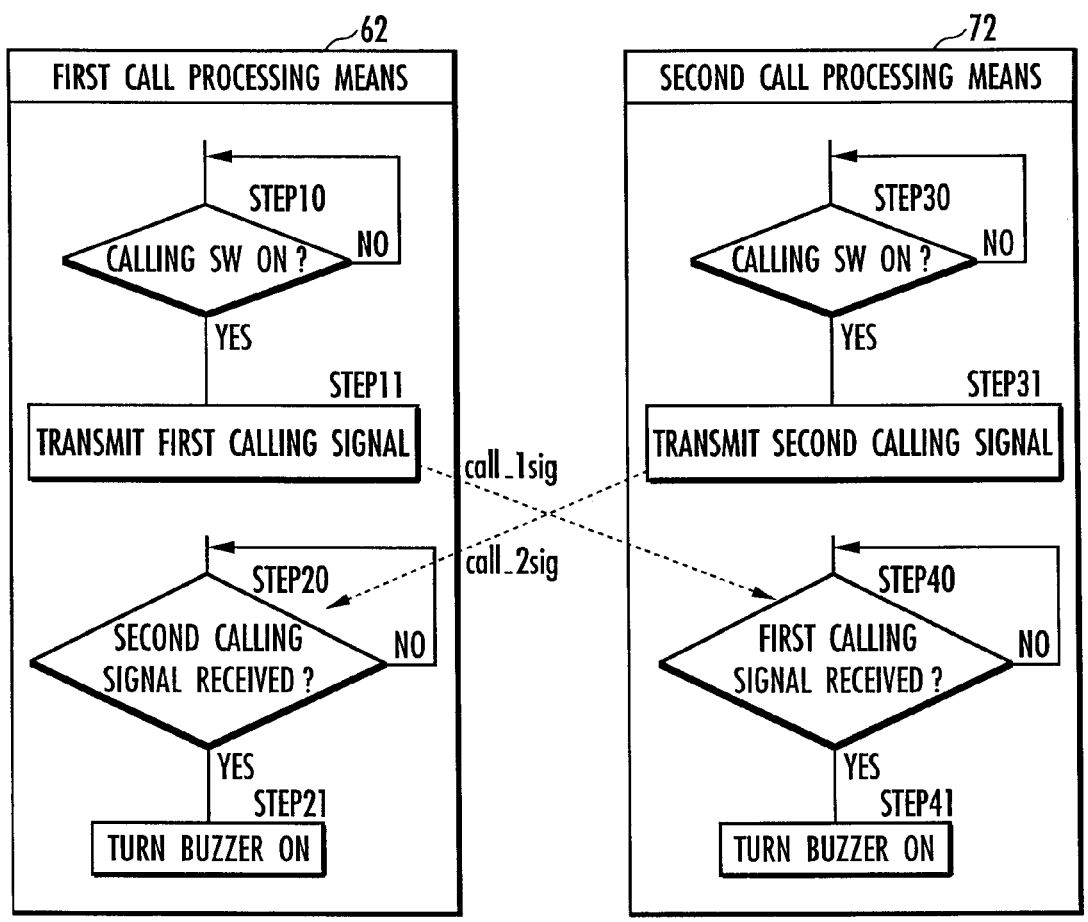
FIG. 7 is a diagram for illustrating a calling process between a bathroom-installed remote controller and a kitchen-installed remote controller.
Figure 8:
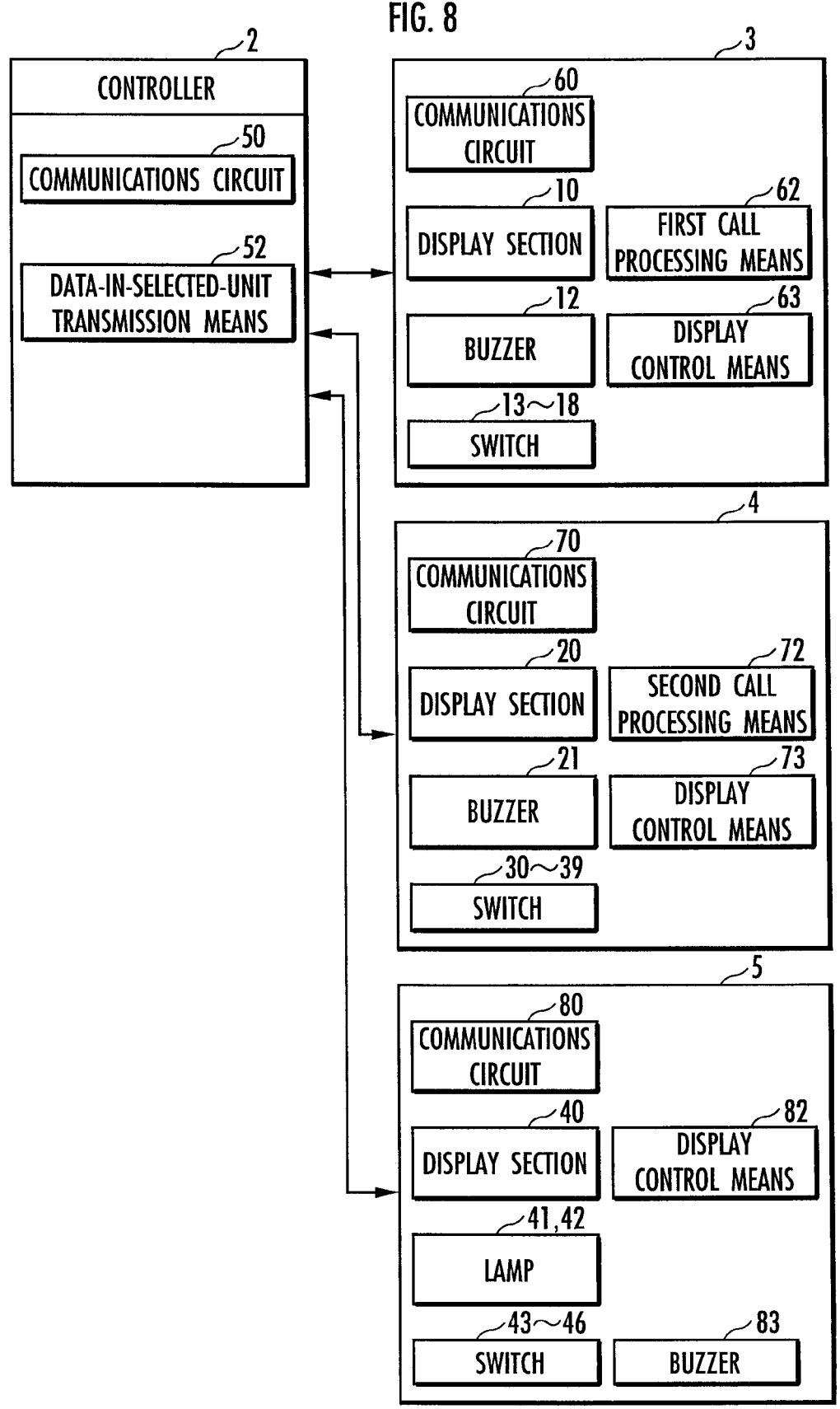
FIG. 8 is a control block diagram for illustrating a second embodiment of the present invention.

Embodiments of the present invention will be described with reference to FIGS. 1 to 9. FIG. 1 is a diagram showing a whole structure of a hot-water supply system according to the present invention. FIG. 2 shows an appearance of a kitchen-installed remote controller shown in FIG. 1. FIG. 3 shows an appearance of a bathroom-installed remote controller shown in FIG. 1. FIG. 4 shows an appearance of an extension remote controller shown in FIG. 1. FIG. 5 is a control block diagram for illustrating a first embodiment of the present invention. FIG. 6 illustrates a Celsius/Fahrenheit conversion table for hot-water temperature according to the first embodiment. FIG. 7 is a diagram for illustrating a calling process between a bathroom-installed remote controller and a kitchen-installed remote controller. FIG. 8 is a control block diagram for illustrating a second embodiment of the present invention. FIG. 9 illustrates a temperature data conversion map according to the second embodiment.

Referring to FIG. 1, a water heater 1 has a bath-filling function of supplying a predetermined amount of hot water to a bathtub (not shown), and a controller 2 for controlling the entire operation of the water heater 1 is connected to three remote controllers for remotely manipulating the water heater 1 (a kitchen-installed remote controller 3 that is installed in a kitchen, a bathroom-installed remote controller 4 that is installed in a bathroom and an extension remote controller that is installed in a washroom or the like) via a communications cable 6. The controller 2 and each of the remote controllers 3, 4 and 5 can communicate with each other, and the kitchen-installed remote controller 3 and the bathroom-installed remote controller 4 can communicate with each other. The kitchen-installed remote controller corresponds to an out-of-bathroom remote controller according to the present invention, and the bathroom-installed remote controller 4 corresponds to an in-bathroom remote controller according to the present invention.

Referring to FIG. 2(a), the kitchen-installed remote controller 3 comprises a display section 10 that indicates hot-water temperature, time or the like, a buzzer 12 (corresponding to first alarm means according to the present invention), an UP switch 13 and a DOWN switch 14 for setting or changing hot-water temperature or time, a functional switch 15 for switching the item (hot-water temperature, buzzer volume, or time) to be manipulated with the UP switch 13 and the DOWN switch 14, a calling switch 16 (corresponding to a first calling switch according to the present invention) for calling up the bathroom-installed remote controller 4, an operational switch 17 for switching the water heater 1 between an operational state (in which the water heater 1 can supply hot water) and a stand-by state (in which the water heater 1 cannot supply hot water), and a priority switch 18 for giving a priority to the kitchen-installed remote controller 3 over the other remote controllers in setting hot-water temperature.

In the stand-by state, only manipulations of the operational switch 17 and the calling switch 16, and combined manipulations of the functional switch 15, and the UP switch 13 and the DOWN switch 14 for setting time or buzzer volume are accepted. Therefore, manipulations of the priority switch 18, and combined manipulations of the functional switch 15, and the UP switch 13 and the DOWN switch 14 for setting hot-water temperature are not accepted.

In addition, if a user performs a special operation of holding the operational switch 17 in the ON state for five or more seconds during the stand-by state, the user can switch the unit of the temperature indicated on the display section 10 (corresponding to a physical quantity concerning the operation of the water heater 1 according to the present invention) between Celsius and Fahrenheit. In this case, the operational switch 17 corresponds to a unit selection switch according to the present invention. FIG. 2(a) shows a display in the case where the special operation of the operational switch 17 is performed, and the display section 10 indicates hot-water temperature in degrees Fahrenheit (° F.). On the other hand, FIG. 2(b) shows a display in the case where the special operation of the operational switch 17 is not performed, and the display section 10 indicates hot-water temperature in degrees Celsius (° C.).

Now, referring to FIG. 3(a), the bathroom-installed remote controller 4 comprises a display section 20 that indicates hot-water temperature, hot-water amount or the like, a buzzer 21 (corresponding to second alarm means according to the present invention), a priority switch 30 for giving a priority to the bathroom-installed remote controller 4 over the other remote controllers in setting hot-water temperature, a calling switch 31 for calling up the kitchen-installed remote controller 3 (corresponding to a second calling switch according to the present invention), an operational switch 32 for switching the water heater 1 between the operational state and the stand-by state, a bath-filling switch 33 for instructing start and stop of bath-filling operation, a power-save switch 34 for setting or resetting a "power-save mode" in which the display section 20 is turned off if a predetermined length of time (25 minutes, for example) has elapsed since the water heater 1 completed the hot-water supply operation, an UP switch 36 and a DOWN switch 35 for setting or changing hot-water temperature, a volume switch 37 for setting or changing the volume of the buzzer 21, and an UP switch 39 and a DOWN switch 38 for setting or changing hot-water amount in the bath-filling operation.

In addition, if the user performs a special operation of holding the operational switch 32 in the ON state for five or more seconds during the stand-by state, the user can switch the units of the temperature and hot-water amount indicated on the display section 20 (corresponding to physical quantities concerning the operation of the water heater 1 according to the present invention) between Fahrenheit/gallon and Celsius/liter. In this case, the operational switch 32 corresponds to the unit selection switch according to the present invention.

FIG. 3(a) shows a display in the case where the special operation of the operational switch 32 described above is performed, and the display section 20 indicates hot-water temperature in degrees Fahrenheit (° F.) and hot-water amount in gallon (gal). On the other hand, FIG. 3(b) shows a display in the case where the special operation of the operational switch 32 described above is not performed, and the display section 20 indicates hot-water temperature in degrees Celsius (° C.) and hot-water amount in liter (l).

Now, referring to FIG. 4(a), the extension remote controller 5 comprises a display section 40 that indicates hot-water temperature, an operation lamp 41 that glows during the hot-water supply operation of the water heater 1, an UP switch 43 and a DOWN switch 44 for setting or changing hot-water temperature, a priority switch 45 setting the extension remote controller 5 at a "priority mode" in which it is given a priority over the other remote controllers in setting hot-water temperature, an operational switch 46 for switching the water heater 1 between the operational state and the stand-by state, and a priority lamp 42 that glows when the extension remote controller 5 is in the "priority mode". In addition, the extension remote controller 5 incorporates a buzzer 83 (see FIG. 5).

In addition, if the user performs a special operation of holding the operational switch 46 in the ON state for five or more seconds during the stand-by state, the user can switch the unit of the temperature indicated on the display section 40 (corresponding to a physical quantity concerning the operation of the water heater 1 according to the present invention) between Celsius and Fahrenheit. In this case, the operational switch 46 corresponds to the unit selection switch according to the present invention.

FIG. 4(a) shows a display in the case where the special operation of the operational switch 46 described above is performed, and the display section 40 indicates hot-water temperature in degrees Fahrenheit (° F.). On the other hand, FIG. 4(b) shows a display in the case where the special operation of the operational switch 46 described above is not performed, and the display section 40 indicates hot-water temperature in degrees Celsius (° C.). In the following, a first embodiment and a second embodiment of the present invention will be described.

First Embodiment

Referring to FIG. 5, according to the first embodiment, the controller 2 comprises a communications circuit 50 that enables communications with the remote controllers 3, 4 and 5, and data-in-predetermined-unit transmission means 51 that transmits data corresponding to hot-water temperature expressed in degrees Celsius and data corresponding to hot-water amount expressed in liter as in-predetermined-unit data.

The kitchen-installed remote controller 3 comprises a communications circuit 60 that enables communications with the controller 2 and the other remote controllers 4 and 5 (corresponding to first communications means according to the present invention), indication unit switching means 61 for indicating the in-predetermined-unit data transmitted from the controller 2 in the unit selected depending on the presence or absence of the special operation of the operational switch 17, first call processing means 62 that performs a calling process for the bathroom-installed remote controller 4 described below, and display control means 63 that controls turn-on/off of the display section 10 and the contents indicated on the display section 10.

The bathroom-installed remote controller 4 comprises a communications circuit 70 that enables communications with the controller 2 and the other remote controllers 3 and 5 (corresponding to second communications means according to the present invention), indication unit switching means 71 for indicating the data representing hot-water temperature, of the in-predetermined-unit data transmitted from the controller 2, in the unit selected depending on the presence or absence of the special operation of the operational switch 32, second call processing means 72 that performs a calling process for the kitchen-installed remote controller 3 described below, and display control means 73 that controls turn-on/off of the display section 20 and the contents indicated on the display section 20.

The extension remote controller 5 comprises a communications circuit 80 that enables communications with the controller 2 and the other remote controllers 3 and 4, indication unit switching means 81 for indicating the data representing hot-water temperature, of the in-predetermined-unit data transmitted from the controller 2, in the unit selected depending on the presence or absence of the special operation of the operational switch 46, display control means 82 that controls turn-on/off of the display section 40 and the contents indicated on the display section 40, and a buzzer 83.

The indication unit switching means 61 of the kitchen-installed remote controller 3, the indication unit switching means 71 of the bathroom-installed remote controller 4 and the indication unit switching means 81 of the extension remote controller 5 change the units of physical quantities indicated on the display sections 10, 20 and 40, respectively, using a data table 100 for unit conversion shown in FIG. 6, which is previously stored in a memory (not shown). Referring to FIG. 6, the data table 100 contains 16 pointers, each of which is assigned to a temperature indication in degrees Fahrenheit, a temperature indication in degrees Celsius and a controlled temperature in degrees Celsius.

In the water heater 1, the controller 2 controls hot-water temperature in degrees Celsius. The data-in-predetermined-unit transmission means 51 in the controller 2 transmits, to each of the remote controllers 3, 4 and 5, the hot-water temperature (in degrees Celsius) detected by a hot-water temperature sensor (not shown) and data about a pointer in the data table 100 that corresponds to the set value of hot-water temperature (in degrees Celsius) transmitted from each of the remote controllers 3, 4 and 5 (the data corresponding to in-predetermined-unit data according to the present invention).

Then, the indication unit switching means 61, 71 and 81 in the remote controllers 3, 4 and 5 indicate, according to the data table 100, the temperature associated with the received pointer in the unit (Celsius or Fahrenheit) selected depending on the presence or absence of the special operation of the operational switch. In this case, the unit of the indicated hot-water temperature can be set individually on each remote controller 3, 4 or 5 through the special operation of the operational switch.

The indication unit switching means 71 in the bathroom-installed remote controller 4 changes not only the indication unit of hot-water temperature but also the indication unit of hot-water amount. Thus, for switching the unit of hot-water amount between liter and gallon, there is provided a data table for hot-water amount that is similar to the data table 100 for hot-water temperature. Once the bathroom-installed remote controller 4 receives data about a pointer indicating the hot-water amount (corresponding to in-predetermined-unit data according to the present invention) transmitted from the data-in-predetermined-unit transmission means 51 in the water heater 1, the hot-water amount associated with the received pointer is indicated on the display section 20 in the unit (liter or gallon) selected depending on the presence or absence of the special operation of the operational switch 32 according to the data table for hot-water amount.

Then, the first call processing means 62 in the kitchen-installed remote controller 3 and the second call processing means 72 in the bathroom-installed remote controller 4 perform a calling process shown in FIG. 7. When the calling switch 16 (see FIG. 2(*a*)) is manipulated in Step 10, the first call processing means 62 in the kitchen-installed remote controller 3 proceeds to Step 11 and transmits a first calling signal (call_1sig) to the bathroom-installed remote controller 4. Similarly, when the calling switch 31 (see FIG. 3(*a*)) is manipulated in Step 30, the second call processing means 72 in the bathroom-installed remote controller 4 proceeds to Step 31 and transmits a second calling signal (call_2sig) to the kitchen-installed remote controller 3.

Furthermore, when the first call processing means 62 receives the second calling signal (call_2sig) transmitted from the bathroom-installed remote controller 4 in Step 20, the first call processing means 62 proceeds to Step 21 and rings the buzzer 12 (see FIG. 2(*a*)). Similarly, when the second call processing means 72 receives the first calling signal (call_1sig) transmitted from the kitchen-installed remote controller 3 in Step 40, the second call processing means 72 proceeds to Step 41 and rings the buzzer 21 (see FIG. 3(*a*)).

As described above, through a process including Steps 10 and 11 performed by the first call processing means 62 and Steps 40 and 41 performed by the second call processing means 72, the buzzer 21 of the bathroom-installed remote controller 4 rings in response to a manipulation of the calling switch 16 of the kitchen-installed remote controller 3, and through a process including Steps 30 and 31 performed by the second call processing means 72 and Steps 20 and 21 performed by the first call processing means 62, the buzzer 12 of the kitchen-installed remote controller 3 rings in response to a manipulation of the calling switch 31 of the bathroom-installed remote controller 4.

Thus, for example, a user in the bathroom can call another user in the kitchen by manipulating the calling switch 31 of the bathroom-installed remote controller 4 to ring the buzzer 12 of the kitchen-installed remote controller 3. Then, the user in the kitchen can acknowledge receipt of the call from the user in the bathroom by manipulating the calling switch 16 of the kitchen-installed remote controller 3 to ring the buzzer 21 of the bathroom-installed remote controller 4.

In this regard, the sound of the buzzer 12 on the called side (the kitchen-installed remote controller 3) ringing in response to a manipulation of the calling switch 31 on the calling side (the bathroom-installed remote controller 4) may be different from the sound of the buzzer 21 on the calling side (the bathroom-installed remote controller 4) ringing in response to a manipulation of the calling switch 16 on the called side (the kitchen-installed remote controller 3).

Since the extension remote controller 5 (see FIG. 4(*a*)) has no calling switch, it cannot call up the other remote controllers 3 and 4. However, when the calling switch 16, 31 of the remote controller 3, 4 is manipulated, the incorporated buzzer 83 (see FIG. 5) rings.

Second Embodiment

Now, with reference to FIGS. 8 and 9, the second embodiment of the present invention will be described. Referring to FIG. 8, the hot-water supply system according to the second embodiment differs from the system according to the first embodiment described above in arrangement for changing the units of physical quantities indicated on the display sections 10, 20 and 40 of the remote controllers 3, 4 and 5. The same components as in the first embodiment shown in FIG. 5 are denoted by the same reference numerals and will not be further described in the following.

The controller 2 has data-in-selected-unit transmission means 52 that transmits in-selected-unit data that represents hot-water temperature and hot-water amount in units selected depending on the presence or absence of the special operation of the operational switch on any of the remote controllers 3, 4 and 5 to the remote controller.

According to the second embodiment, when the special operation of the operational switch 17, 32, 46 described above is performed on any of the remote controllers, the remote controller transmits, to the controller in the water heater 1, data that indicates that Fahrenheit is selected as the unit of hot-water temperature and gallon is selected as the unit of hot-water amount.

If Celsius and liter are selected as the indication units, the data-in-selected-unit transmission means 52 transmits, to each of the remote controllers 3, 4 and 5, data that represents hot-water temperature in degrees Celsius used for controlling hot-water temperature and data that represents hot-water amount in liter used for controlling the bath filling operation as in-selected-unit data.

Alternatively, if Fahrenheit and gallon are selected as the indication units, the data-in-selected-unit transmission means 52 converts the hot-water-temperature data in degrees Celsius into data in degrees Fahrenheit based on a data table 110 shown in FIG. 9. Similarly, the data-in-selected-unit transmission means 52 converts the hot-water-amount data in liter into data in gallon based on a gallon/liter conversion table (not shown). Then, the data-in-selected-unit transmission means 52 transmits the unit-converted data to each of the remote controllers 3, 4 and 5.

When the display control means 63 in the kitchen-installed remote controller 3 receives the in-selected-unit data, the display control means 63 provides, on the display section 10, an indication of hot-water temperature represented by the in-selected-unit data without changing the indication unit. When the display control means 73 in the bathroom-installed remote controller 4 receives the in-selected-unit data, the display control means 73 provides, on the display section 20, indications of hot-water temperature and hot-water amount represented by the in-selected-unit data without changing the indication units. When the display control means 82 in the extension remote controller 5 receives the in-selected-unit data, the display control means 82 provides, on the display section 40, an indication of hot-water temperature represented by the in-selected-unit data without changing the indication unit.

In this case, the indication unit of a physical quantity can be changed on all the remote controllers at once by performing the special operation of any of the operational switches 17, 32 and 46 on the kitchen-installed remote controller 3, the bathroom-installed remote controller 4 and the extension remote controller 5, respectively.

The hot-water supply systems according to the embodiments of the present invention described above indicate hot-water temperature and hot-water amount on the display sections of the remote controllers as physical quantities concerning the operation of the water heater of the present invention. However, the hot-water supply system may provide indications of other various physical quantities, such as flow rate of hot water supplied and energy consumed by the hot-water supply operation.

What is claimed is:

1. A hot-water supply system, comprising:
   a water heater; and
   a remote controller for remotely controlling the water heater that has a display section for indicating a physical quantity concerning the operation of the water heater,
   wherein the hot-water supply system has:
   a unit selection switch for selecting the unit for indicating said physical quantity on said display section from among a plurality of kinds of units previously set through the operation of a user;
   indication unit switching means for indicating said physical quantity on said display section in the unit selected by the unit selection switch; and
   an out-of-bathroom remote controller provided outside a bathroom and an in-bathroom remote controller provided in the bathroom as said remote controller,
   said out-of-bathroom remote controller has first communications means for communicating with said in-bathroom remote controller, a first calling switch manipulated by a user, first alarm means, and first call processing means that transmits a first calling signal to said in-bathroom remote controller when the first calling switch is manipulated, and makes said first alarm means issue an alarm when a second calling signal transmitted from said in-bathroom remote controller is received, and
   said in-bathroom remote controller has second communications means for communicating with said out-of-bathroom remote controller, a second calling switch manipulated by a user, second alarm means, and second call processing means that transmits said second calling signal to said out-of-bathroom remote controller when the second calling switch is manipulated, and makes said second alarm means issue an alarm when said first calling signal transmitted from said out-of-bathroom remote controller is received.

2. The hot-water supply system according to claim 1, wherein said water heater transmits in-predetermined-unit data corresponding to data about said physical quantity expressed in a predetermined unit to said remote controller,
   said indication unit switching means is provided on said remote controller, and when said indication unit switching means receives said in-predetermined-unit data transmitted from said water heater, said indication unit switching means indicates the physical quantity corresponding to the in-predetermined-unit data in the unit selected by said unit selection switch.

3. The hot-water supply system according to claim 1, wherein said indication unit switching means comprises:
   data-in-selected-unit transmission means provided on said water heater for transmitting in-selected-unit data that represents said physical quantity in the unit selected by said unit selection switch to said remote controller; and
   display control means provided on said remote controller for indicating the in-selected-unit data on said display section.

4. A hot-water supply system, comprising:
   a water heater; and
   a remote controller for remotely controlling the water heater that has a display section for indicating a physical quantity concerning the operation of the water heater,
   wherein the hot-water supply system has:
   a unit selection switch for selecting the unit for indicating said physical quantity on said display section from among a plurality of kinds of units previously set through the operation of a user;
   indication unit switching means for indicating said physical quantity on said display section in the unit selected by the unit selection switch, and
   an out-of-bathroom remote controller provided outside a bathroom and an in-bathroom remote controller provided in the bathroom as said remote controller,
   wherein said indication unit switching means comprises:
   data-in-selected-unit transmission means provided on said water heater for transmitting in-selected-unit data that represents said physical quantity in the unit selected by said unit selection switch to said out-of-bathroom remote controller and said in-bathroom remote controller; and
   display control means provided on each of said out-of-bathroom remote controller and said in-bathroom remote controller for indicating the in-selected-unit data on said display section of said out-of-bathroom remote controller as for the out-of-bathroom remote controller, and for indicating the in-selected-unit data on said display section of said in-bathroom remote controller as for the in-bathroom remote controller.

* * * * *